Feb. 6, 1973   C. BASTIDE   3,715,080
SPRAYING DEVICE FOR A LIQUID DISTRIBUTING SYSTEM
FOR AGRICULTURAL USE
Filed Nov. 3, 1971   2 Sheets-Sheet 1

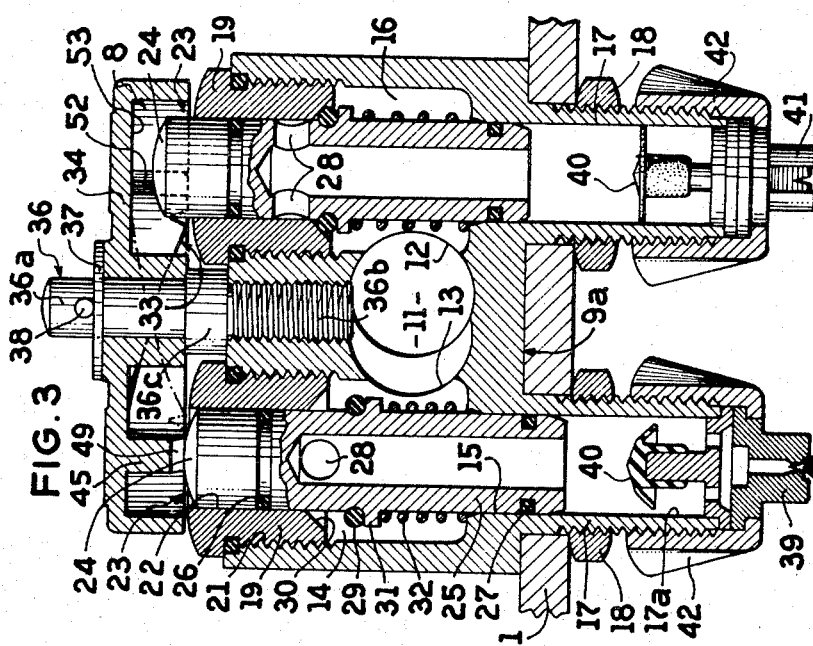
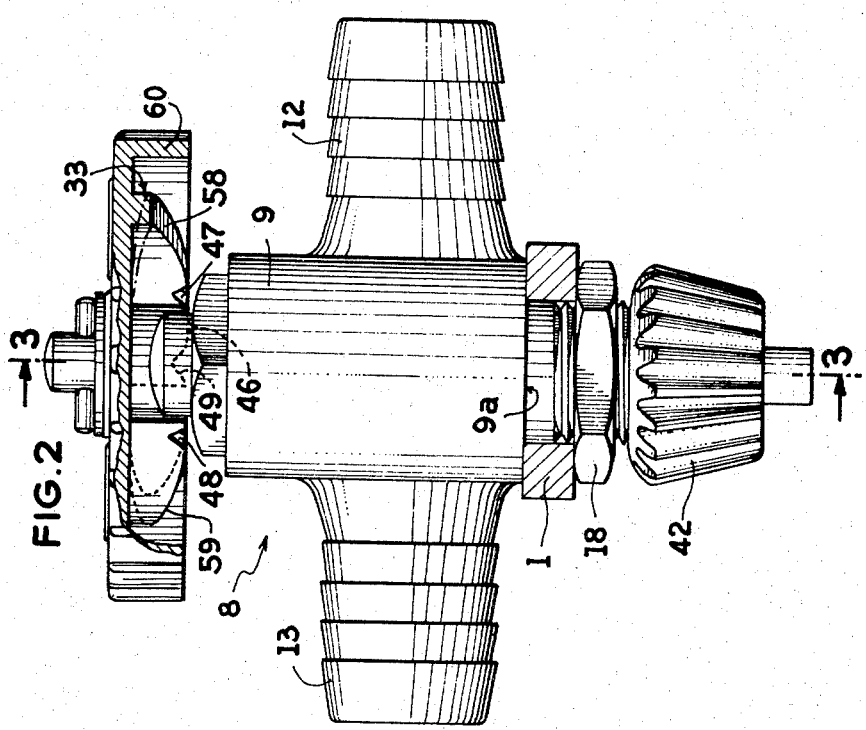

United States Patent Office 3,715,080
Patented Feb. 6, 1973

3,715,080
SPRAYING DEVICE FOR A LIQUID DISTRIBUTING SYSTEM FOR AGRICULTURAL USE
Claude Bastide, Colombes, France, assignor to Etablissements Roffo, Livry-Cargan, France
Filed Nov. 3, 1971, Ser. No. 195,211
Claims priority, application France, Nov. 23, 1970, 7041984, Sept. 27, 1971, 7134666
Int. Cl. A62c 31/00
U.S. Cl. 239—444
16 Claims

ABSTRACT OF THE DISCLOSURE

A spraying device for agricultural use having two spray nozzles and supplied with liquid under pressure such as a liquid fertilizer. The device has a liquid supply chamber which communicates with the two nozzles through two distributing chambers. The two nozzles give different sprays. A cam means acts on two valve members respectively movable in the two distributing chambers for causing, in a first position of the cam means, a first of the valve members to close off the corresponding distributing chamber from the supply and the second valve member to allow the supply of liquid into its corresponding distributing chamber and, in a second position of the cam means, the first valve member to allow the supply of the liquid into its corresponding distributing chamber and the second valve member to close off its corresponding distributing chamber from the supply. A third position of the cam means causes both valve members to allow the supply of the liquid to their distributing chambers.

Figure 1:
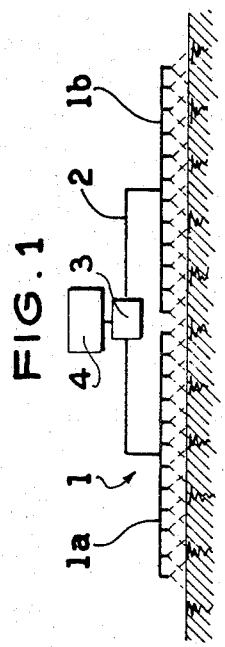

The spraying device is adapted to be mounted on a liquid spraying distributor with a plurality of other such devices.

---

The present invention relates to distributors for the spreading or distribution of liquid for agricultural use, for example a liquid fertilizer, comprising a number of spraying devices arranged along the distributor and supplied with liquid under pressure from a source. These distributors are part of apparatuses which are towed along or carried by tractors and effect, for appropriate characteristics of the spraying devices and in accordance with the speed of travel of the tractor and pressure of the liquid, a given density of distribution per hectare of land.

Known spraying devices are provided with a single detachable spraying nozzle to which corresponds a working range, that is to say, a range of flows defined by the calibration of the orifice of the nozzle and the pressure of the liquid. The detachability of the nozzle permits a modification of the working range and consequently a modification for given supply conditions, of the amount of liquid sprayed per unit area. In the case of fertilizers, this usually varies from 150 to 700 litres per hectare.

A drawback of the known device of the interchangeable single nozzle type is that changing the nozzles requires an appreciable amount of time owing to the fact that a distributor usually has 24–36 nozzles. Moreover, the sets of nozzles must be carefully stored away so as to avoid mixing nozzles having different characteristics.

An object of the invention is to remedy the aforementioned drawbacks.

The invention provides a spraying device comprising a supply chamber communicating with two distributing chambers connected to respective pipes which are provided with different spray nozzles and are controlled by two slidable valve members subjected to the action of a cam which is formed on a manually-controlled rotatable member and has a profile which is such that it has at least three positions, in one of which the liquid is sprayed by one of the nozzles, and in a second of which the liquid is sprayed by the other nozzle and in a third position the liquid is sprayed by both nozzles.

Owing to the possibility of employing the two nozzles of the spraying device separately or in combination thus providing three working ranges, the invention affords the users facilities which do not exist with conventional arrangements. The adjustment is simply achieved by rotation of a member, which is for example a wheel or plate, and this saves time with respect to operations required for changing nozzles. Further, in the case of nozzles producing a paint-brush shaped or fish-tail spray which must have a given orientation, the orientation does not have to be reset since the nozzles are never dismantled.

It may be added that for the equipment of a distributor employing the device according to the invention, there is in fact a saving in that the set of nozzles which would correspond in known distributors to the working range given by the combined utilization of the two nozzles in each spraying device according to the invention is dispensed with.

In the case where the distributor on which the spraying device is mounted is supplied with liquid by a constant-displacement pump driven by a wheel in frictional contact with the ground, it is possible to obtain a variation in the range of once to twice the speed of travel of the distributor for a given regulation of the capacity of the pump without changing the spraying density.

It is also possible to increase the possibilities of utilization of the device according to the invention by adopting for the cam formed on the rotatable member a profile which gives, in addition to the three aforementioned positions, a fourth position in which the two nozzles are simultaneously closed.

This last possibility is of definite interest when it is desired to spray over a reduced width of ground, for example to terminate the treatment of a field whose width is not necessarily a multiple of the width of the spraying distributor. Any working width can be obtained by stopping the spraying in any portion of the distributor.

The choice of a profile achieving the complete closure of the spraying device affords additional working ranges in the case where the nozzles employed are nozzles having a wide angle (110° C.), that is to say in respect of which sprays emitted by nozzles pertaining to two spraying devices separated by an intermediate device have overlapping sprayed areas on the ground. It is indeed possible by completely closing every other spraying device to obtain three new working ranges corresponding in each device to distribution through one of the nozzles, through the other nozzle and through both nozzles respectively.

These new ranges corresponding to exactly one half of the flow ranges obtained when the spraying devices are operative.

Further features and advantages of the invention will be apparent from the ensuing description with reference to the accompanying drawings.

Figure 4:
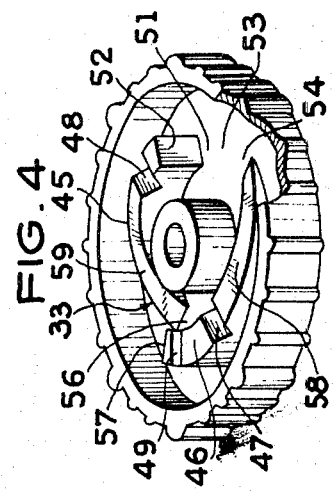
Figure 5:
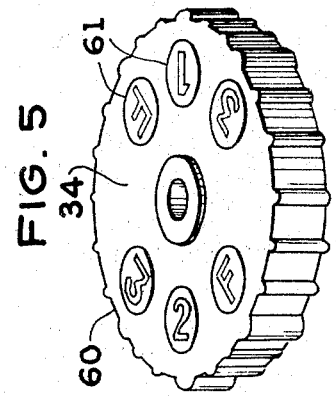

In the drawings:
FIG. 1 is a diagrammatic view of a spraying distributor;
FIG. 2 is an elevational view of one of the spraying devices mounted on the distributor shown in FIG. 1;
FIG. 3 is a sectional view taken on line 3—3 of FIG. 2;
FIG. 4 is a view of the underside of the disc including the control cam employed in the spraying device shown in FIGS. 2 and 3, and
FIG. 5 is a perspective top view of the disc.

The apparatus shown in FIG. 1, which is coupled to or carried by a tractor, comprises a spraying distributor 1 constituted by two elements 1a and 1b supplied by way of conduits 2 which communicate with a pressure regulator 3 to which a constant-displacement pump 4 supplies the liquid to be sprayed. Each of the distributor elements 1a and 1b comprises spraying devices 8 arranged symmetrically with respect to the corresponding connection or supply conduit 2.

Each spraying device comprises inside a body 9 a supply chamber 11 with which communicate two connectors 12, 13 located on opposite sides of the body 9 and adapted to be connected to two elements of the conduit 2 supplying the liquid so that they receive the liquid under pressure from the pump 4 and transmit it to the spraying device located on the distributor 1.

The supply chamber 11 also communicates with two cylindrical distributing chambers 14, 16 having a vertical axis disposed on each side of the centre chamber 11 with respect to the connectors 12, 13 and extending downwardly in the form of a cylindrical pipe 17 which has an external screwhead for receiving fixing nuts 18 which clamp the lower plane face 9a of the body 9 against the distributor 1.

The chambers 14, 16 are closed at their upper ends by a plug 19 which screwthreadedly engaged in a tapped hole 21 which upwardly extends the two chambers through the body and in which is formed a bore or aperture 22 which has the same axis and the same diameter as the internal aperture or bore 17a of the lower pipe 17. Mounted in this bore is a slidable closing or valve member 23 which has an upper part constituting a head 24 rendered fluidtight by a toric ring 26 inserted in a groove and a major part in the shape of a tube 25 whose lower end is slidable in the bore 17a of the pipe 17 and in an aperture 15 of the body which connects the pipe 17 to the chambers 14 or 16. A toric ring 27 affords a seal between the valve member 23 and the bore 17a and aperature 15.

The inner aperature of the tubular part 25 of the valve member 23 communicates with the chambers 14 or 16 by way of radial orifices 28. The communication may be cut off by contact between a part-conical seat 30 formed in the lower part of the plug 19 and a toric sealing ring 29 which is carried by an outer flange 31 of the valve member and is biased toward the closing position by a spring 32 compressed between the flange 31 and the bottom of the chambers 14 or 16.

The valve member 23 can be displaced out of its closing position in opposition to the action of the spring 32 by the effect of the contact between the rounded or crowned top of the head 24 and an annular cam 33 formed on the underside of a plate or disc 34 through which freely extends a small cylindrical portion 36a of a spindle 36. A lower portion 36b of the latter is screwthreadedly engaged in the body 9 and an enlarged portion 26c bears on the upper face of the body and forms a shoulder against which the plate 34 is retained by a washer 37 which is disposed on the upper face of the plate 34 and held axially stationary by a pin 38. Thus the plate 34 is rotatable about the spindle 36 so that the annular cam 33 can offer to the valve heads 24 a variable portion of its development and can thus act on the valve member in a coordinated manner so as to open them or allow them to close under conditions which will be explained hereinafter.

When the two valve members 23 are opened, the liquid arriving by way of the connector 12 is divided between the two distributing chambers 14 and 15 and is sprayed or sprinkled in the form of sprays through two nozzles 39, 41 mounted on the pipes 17 by means of a ring 42 which is screwthreadedly engaged with the outer screwthreaded portion of the pipes 17 beneath the chambers 14 and 15 respectively.

The reference numeral 40 designates a diaphragm valve which is interposed in each pipe 17 between the valve member 23 and the nozzle 39 or 41 and which, when in the open position, allows the liquid through but retains the liquid contained in the liquid supply line when the supply of liquid ceases.

The shape of the mouth of the nozzles 39, 41 is different so that there is a difference in the amount of liquid distributed per unit time by the respective nozzles and consequently in the flow of liquid distributed or sprinkled over the ground.

As can be seen in FIG. 4, the cam 33 is shaped on a generally circular flange 45 formed on the underside of the plate 34. Provided in the edge 46 of the flange 45 are two diametrically opposed shallow recesses 47, 48 and a third recess 49 which is identical to the recesses 47, 48 and angularly offset about 45° from the recess 47 and diametrically opposed to one end 51 defined by an upstanding face 52 adjacent the recess 48 of a deep recess 53 in the flange 45 which defines a face coinciding with the face of the plate 34 and has an angular extent of about 70°. The other end 54 of the recess 53 is diametrically opposed to another deep recess 56 having an angular extent of about 20° and defined at one end by an upstanding face 57 adjacent the recess 49. Two helical ramps 58, 59 respectively interconnect the end 54 of the recess 53 to the recess 47 and the recess 56 to the recess 48.

In the position of the plate or disc 34 shown in FIG. 3, the head 24 of the valve member 23 controlling the chamber 16 extends into the recess 53 of the cam and remains out of contact with the face of the plate so that this valve member is closed whereas the other valve member 23 controlling the chamber 14 is in its fully open position owing to the fact that the recess 49 held in contact with the head 24 urges the valve member downwardly. Consequently, the spraying is effected solely by the nozzle 39 which, for example, corresponds to a spray density within the range of 150–300 litres/hectare.

In a position of the plate 34 turned through 180° with respect to the position shown in FIG. 3, it is the valve 23 controlling the chamber 16 which is open while the valve controlling chamber 14 is closed. The spraying is then effected for example at a density of within the range of 200–400 litres/hectare.

When the two recesses 47, 48 of the cam are in alignment with the valves 23, both of the latter are open and the spraying of the ground is effected at a rate equal to the sum of the flow rates afforded by the nozzles 39 and 41, namely at a spraying density in the range of 350–700 litres/hectare.

It will be understood that the two nozzles are closed when the two recesses 56, 54 are in alignment with the respective valve members.

The described arrangement therefore affords the user three distinct working or operating ranges and a fully-closed position.

FIG. 5 shows the plate or disc 34 which has a ribbed skirt portion 60 and a top face including references 61 to facilitate the setting of the plate.

It will be understood that it is possible to provide on the same device two nozzles giving different spray shapes, for example one conical and the other fish-tail.

The distributor 1 is normally intended for spraying or sprinkling liquid fertilizer. However, it will be understood that it may be employed for spraying any liquid employed in agriculture.

The offset between the connectors 12, 13 shown in FIG. 3 is provided in order to permit an injection moulding of the spraying device body 9.

Having now described my invention what I claim and desire to secure by Letters Patent is:

1. A spraying device for mounting on a liquid spraying distributor for agricultural use and for connection to a source of liquid under pressure, said device comprising a supply chamber for connection to said source, means defining two distributing chambers communicating with the supply chamber, two pipes respectively communicating with the two distributing chambers, two different spray nozzles respectively communicating with the two pipes, two movable valve members respectively associated with the two distributing chambers and each movable between a first position for preventing said liquid from flowing through the corresponding distributing chamber and a second position for allowing said liquid to flow through the corresponding distributing chamber, rotatable cam means in engaging relation to the two valve members and capable of moving the two valve members between said two positions of the valve members, the cam means being movable between a first position in which one of the valve members is in said first position of the valve member and the other of the valve members is in said second position of said other valve member, a second position in which said one valve member is in said second position of said one valve member and said other valve member is in said first position of said other valve member and a third position in which both valve members are in said second positions of said valve members.

2. A device as claimed in claim 1, wherein the cam means has a fourth position in which both valve members are in said first positions of the valve members.

3. A device as claimed in claim 1, wherein the two nozzles have different configurations so that for a given supply pressure of the liquid the nozzles distribute the liquid at different flow rates.

4. A device as claimed in claim 1, wherein the two nozzles have different configurations so that the two shapes of the liquid spray emitted thereby are different.

5. A device as claimed in claim 4, wherein the nozzles emit liquid sprays having a conical shape and a fish-tail shape respectively.

6. A device as claimed in claim 1, wherein each valve member comprises a cylindrical head in engaging relation to the cam means, a tubular portion extending from the head and through the corresponding distributing chamber, the tubular portion defining a cavity communicating with the corresponding pipe, means defining an orifice in the tubular portion for putting the cavity in communication with the corresponding distributing chamber, a first means defining a seat and a second means defining a sealing ring co-operative with the seat, one of said first and second means being carried by the valve member and the other of said first and second means being carried by the distributing chamber, the sealing means being applied against the seat and stopping communication between the cavity and the distributing chamber in said first position of the valve member and the sealing means being separated from the seat in said second position of the valve member.

7. A device as claimed in claim 6, comprising an outer flange on the tubular portion of each valve member, the flange carrying the sealing ring and being subjected to the action of a spring which bears against an end portion of the corresponding distributing chamber and biases the valve member into said first position of the valve member.

8. A device as claimed in claim 1, wherein the cam means has an axis of rotation which is contained in a plane containing the two valve members.

9. A device as claimed in claim 1, wherein the cam means comprises regions which project in the direction of the valve members so that when one of said regions is in alignment with a valve member the valve member is urged to said second position of the valve member, and a recessed region which when it is in alignment with a valve member the valve member is free to move to said first position of the valve member.

10. A device as claimed in claim 9, wherein there are two of said projecting regions in diametrically opposed relation to each other.

11. A device as claimed in claim 9, wherein one projecting region is diametrically opposed to the recessed region.

12. A device as claimed in claim 9, further comprising a second recessed region in diametrically opposed relation to the first-mentioned recessed region.

13. A device as claimed in claim 1, comprising a rotatable plate carrying the cam means.

14. A device as claimed in claim 9, comprising cavities in said projecting regions and engageable with the valve members for determining positions of co-operation between said projecting regions of the cam means and the valve members.

15. A device as claimed in claim 1, wherein each pipe has an anti-drop valve interposed between the nozzle and the corresponding valve member for preventing escape of said liquid remaining in said distributing chamber when the valve member is put in said first position of the valve member.

16. A distributor for spraying a liquid for agricultural use comprising, arranged along its length, a plurality of spraying devices communicating with a source of said liquid under pressure, each spraying device comprising a supply chamber for connection to said source, means defining two distributing chambers communicating with the supply chamber, two pipes respectively communicating with the two distributing chambers, two different spray nozzles respectively communicating with the two pipes, two movable valve members respectively associated with the two distributing chambers and each movable between a first position for preventing said liquid from flowing through the corresponding distributing chamber and a second position for allowing said liquid to flow through the corresponding distributing chamber, rotatable cam means in engaging relation to the two valve members and capable of moving the two valve members between said two positions of the valve members, the cam means being movable between a first position in which one of the valve members is in said first position of the valve member and the other of the valve members is in said second position of said other valve member, a second position in which said one valve member is in said second position of said one valve member and said other valve member is in said first position of said other valve member and a third position in which both valve members are in said second positions of said valve members.

References Cited

UNITED STATES PATENTS

| | | | |
|---|---|---|---|
| 491,272 | 2/1893 | Schier | 239—445 |
| 979,335 | 12/1910 | Reid | 239—447 |
| 1,592,209 | 7/1926 | Heine | 239—563 |
| 2,538,211 | 1/1951 | Prout | 239—446 |
| 3,049,303 | 8/1962 | Kocher | 239—444 |
| 1,091,952 | 3/1914 | North | 239—564 |
| 3,002,694 | 10/1961 | Grant | 239—562 |
| 2,197,231 | 4/1940 | Walker | 239—551 |
| 2,630,324 | 3/1953 | Lay | 239—551 |
| 3,111,268 | 11/1963 | Butler | 239—446 |

LLOYD L. KING, Primary Examiner

U.S. Cl. X.R.

239—563